May 6, 1941. A. W. PETERSON 2,241,001
TRELLIS FOR SUPPORTING GROWING PLANTS
Filed Nov. 3, 1939
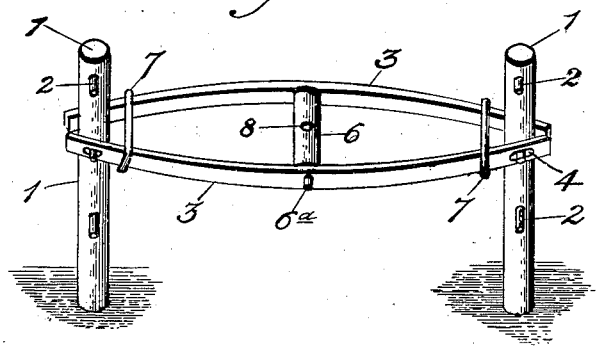
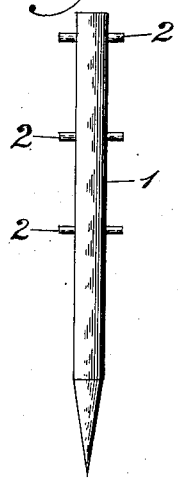
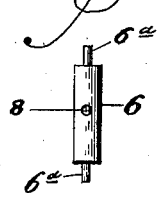
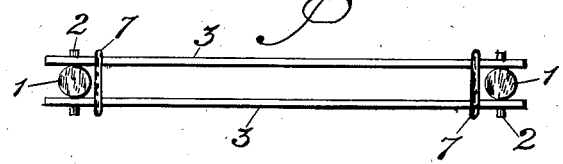
Inventor
Arthur W. Peterson,
By E. E. Overholt.
Attorney.

Patented May 6, 1941

2,241,001

UNITED STATES PATENT OFFICE 2,241,001

TRELLIS FOR SUPPORTING GROWING PLANTS

Arthur W. Peterson, Albert City, Iowa

Application November 3, 1939, Serial No. 302,784

2 Claims. (Cl. 47—47)

My invention relates to trellises or frames for supporting growing vines and the like, such, for instance, as tomatoes whose fruit is so heavy that unless the vines are supported much of the fruit will be on the ground where it becomes easily damaged; and the vines will, in large measure, be pulled down close to the ground by the weight of the fruit.

My object is to provide a cheaply-constructed knock-down device of this character which can be quickly and easily set up for use during the growing season, and can then be as easily taken down, when the season is over, and laid aside ready for use the next year.

A marked characteristic of the device is that, with the exception of a hammer to drive the stakes into the ground, no tools of any kind, and no nails, screws, or other securing devices are required in setting up the device for use; and yet the several parts of the device are every one held in locked relationship to each other.

A leading feature of the device consists of two horizontally disposed flexible bars spaced from each other sufficiently to receive the plants between them; said bars being supported by vertical stakes anchored in the ground, and to which stakes the bars are detachably secured; and a detachable spreader midway of the bars for bowing the strips outwardly from each other, whereby to lock the parts together, while at the same time providing ample space between the bars for the reception of the growing plants.

The invention consists in certain novel features of construction and arrangement of parts, as will be hereinafter described and claimed, reference being had to the accompanying drawing in which—

Fig. 1 is a perspective view of my device complete, as it stands when ready for use. Fig. 2 is a side elevation of one of the stakes. Fig. 3 is a top plan view of the spreader. Fig. 4 is a side elevation of one of the flexible side strips, and Fig. 5 is a top plan view of the device as it appears before the spreader is inserted in place.

Referring further to the drawing, the stakes I are made sharp at their lower ends so that they can be easily driven into the ground, and their upper portions are provided with one or more pairs of horizontal pins 2 extending outwardly from diametrically opposite sides of the stakes, each pin of a pair being in alinement with the other.

Each flexible strap 3 of the device is provided at each end with a short slot 4; and preferably at its centre with a small bore 5.

The spreader 6 of the device is provided at its ends with small studs 6a which are of a size to be easily received into the bores 5 at the centres of the flexible strips 3.

The loops or bands 7 are formed of strong flexible material, either metal or fiber, as may be found most convenient.

When it is desired to assemble the parts in operative relation to each other, the stakes are driven into the ground at points spaced from each other a distance slightly less than the length of the flexible side strips 3 whose end slots 4 are of a width to be easily received upon the alined pins 2 of the stakes I, the stakes being so turned when driven as to cause said pins to extend in a direction at right angles to a line extending from one post to the other. The flexible strips 3 are laid together and the bands 7 are slipped over their ends towards the middle of the pair of strips; the ends of the strips are then caused to engage the stakes I with the pins 2 of the stakes entered in the slots 4 of the strips. The bands 7 are then moved outwardly to their respective stakes, all as shown in Fig. 5, from which it will be seen that the bands or loops 7 are of a length to hold both the strips from slipping off the pins 2 at either side of the stakes I. Then the two flexible strips are forced outwardly from each other at their central portion, and the spreader 6 is inserted between them, with the studs 6a on the ends of the spreader received into the central bores 5 of the strips, as illustrated in Fig. 1 of the drawing. Bulging the side strips thus outwardly from each other will, of course, cause the ends of the strips to move slightly inwardly, and this movement is permitted by the length of the slots 4 in the ends of the strips.

When the strips 3 are thus bowed outwardly, the links or bands 7 act as fulcrums which cause the ends of the strips to clamp the posts or stakes I with a pincer-like action; and the natural tendency of the strips to straighten themselves by moving inwardly toward each other at their centres, causes them to hold the spreader 6 securely in place; and thus the parts are all detachably and yet securely held in locked relation to each other, the spreader 6 forming the final key, as it were, which brings all the other parts into locked relationship to each other.

The stakes I may be provided with as many pairs of pins 2 as may be desired, which serves to adapt the device for use with vines of different heights; and the stakes may, of course, be made any desired length according to the kind of vines with which the device is to be used.

For supporting small vines planted close together, or drilled in rows, the device may be used as illustrated in Fig. 5, with the spreader omitted; and in cases of this kind the elongated strips 3 may be longer and the stakes correspondingly farther apart because of the much less weight imposed upon the device.

When the plants are small, the strips 3 may be secured to the stakes in engagement with the lower pairs of pins 2, and as the plants grow taller the strips can be moved up and made to engage the next higher pair of pins, etc.

More than one pair of strips at a time may be used if desired; and in exceptional cases where the stakes 1 are very far apart, I provide the brace or spreader 6, with a bore 8 through which a round stake may be passed downwardly and driven into the ground. This will support the strips 3 against swaying laterally during heavy wind storms when they are loaded with vines.

Having now described my invention, what I claim as new and desire to secure by Letters Patent is:

1. In a device of the character described, a pair of stakes adapted to be anchored in the ground at points suitably spaced from each other; a pair of flexible strips slightly longer than the space between said stakes; means for detachably securing the strips at their ends to the pair of stakes on opposite sides thereof, whereby the strips are held spaced apart on the pair of stakes; and a detachable spreader midway between the strips for bowing them outwardly from each other, whereby to provide ample space at their centers between the strips for growing plants.

2. In a device of the character described, a pair of elongated flexible strips having slotted openings near their ends; a pair of stakes adapted to be anchored in the ground at points spaced from each other a distance slightly less than the length of the strips, each of said stakes having a pair of alined pintlets projecting from diametrically opposite sides thereof in a direction at right angles to a line extending from one stake to the other, said flexible strips having elongated openings near each end, into which opening the pintlets are received, whereby the strips are supported on the stakes and held in spaced relation to each other thereon; a band at each end of said pair of strips at the inner side of each post, for holding the ends of said strips against movement outwardly from each other on said pintlets; and a spreader midway between the ends of the strips for bending them outwardly from each other, whereby to form the ends of said strips into pincer-like jaws for engagement with said stakes; and whereby also to provide ample space between the strips for the reception of growing plants.

ARTHUR W. PETERSON.